United States Patent [19]

Howell

[11] 4,297,741
[45] Oct. 27, 1981

[54] RATE SENSING INSTANTANEOUS TRIP MODE NETWORK

[75] Inventor: Edward K. Howell, Simsbury, Conn.

[73] Assignee: General Electric Company, New York, N.Y.

[21] Appl. No.: 72,374

[22] Filed: Sep. 4, 1979

[51] Int. Cl.³ .............................................. H02H 3/08
[52] U.S. Cl. ......................................... 361/93; 361/96
[58] Field of Search ...................... 361/95, 96, 93, 9.1, 361/97, 98

[56] References Cited

U.S. PATENT DOCUMENTS 3,846,675 11/1974 Shimp .................................. 361/95

FOREIGN PATENT DOCUMENTS 307459 8/1971 U.S.S.R. .............................. 361/96

Primary Examiner—Harry E. Moose, Jr.
Attorney, Agent, or Firm—Robert A. Cahill; Walter C. Bernkopf; Philip L. Schlamp

[57] ABSTRACT

Air core current transformers respectively linked with the phase conductors of a power distribution circuit develop secondary voltage signals proportional to the rates of change of the phase currents. A full-wave rectifying network provides a rectified output voltage signal corresponding to the highest magnitude secondary voltage signal. A comparator issues a circuit breaker trip initiating signal when the output voltage signal achieves a pre-selected threshold voltage.

10 Claims, 3 Drawing Figures

RATE SENSING INSTANTANEOUS TRIP MODE NETWORK

BACKGROUND OF THE INVENTION

Heretofore, tripping of cricuit breakers equipped with static trip units has been predicated on detection of the peak amplitude of any overcurrent flowing in the power distribution circuit being protected, as sensed by iron-core current transformers individually linked with the load current carrying conductors. Unfortunately, for high level fault currents, typical iron-core current transformers utilized in static trip circuit breakers saturate well before the fault current achieves its peak. Once the current transformers go into saturation, information as to the instantaneous amplitude of the fault currents disappears since the secondary voltage simply collapses to zero. It would be desirable, from the standpoint of nuisance trip prevention, to set the instantaneous trip for a particular circuit breaker frame size at an overcurrent level just below its so-called "popping" level, i.e., the level of overcurrent at which the breaker contacts will be forced apart by the extreme electromagnetic forces associated therewith. This popping level may be, for example, as high as thirty-five times the breaker's continuous current rating. Yet, typical iron-core current transformers utilized in such circuit breakers will be driven into saturation at much lower overcurrent levels, e.g., fifteen times the breaker's continuous current rating. Under these circumstances, it is typically not possible to take advantage of the full short-time current rating of a particular circuit breaker design which is defined as the time duration that a particular overcurrent level can be endured before the breaker contacts pop open.

Moreover, pure overcurrent peak detection is not completely satisfactory from the standpoint of nuisance tripping since undesired instantaneous breaker tripping can result from "offset" current transients (exponentially inherent in switching inductive loads and decaying transient components) usually encountered in high level faults.

In order to raise the saturation level of iron-core current transformers, the size of the core must be increased. The current transformers then become so large as not to be readily accommodatable in molded case circuit breakers. The alternative is to install the current transformers externally of the breaker case which takes up additional switchboard space, adds installation expense, and, due to the necessary external wiring, degrades reliability.

Several solutions to this problem have been disclosed in the patented prior art. In U.S. Pat. No. 3,846,675, it is proposed to predicate circuit breaker tripping on sensing how soon after a current zero an iron-core current transformer is driven into saturation by a sinusoidal high fault current wave. By this approach, the eventual peak amplitude of the current wave is anticipated. An alternative approach disclosed in this patent is to utilize a non-saturable, air-core current transformer to develop a full transformation of the fault current wave in its secondary windings which is then peak detected pursuant to deciding whether or not to initiate a circuit breaker trip function. Still another approach is disclosed in U.S. Pat. No. 3,673,455, wherein the secondary winding of a current transformer inductively coupled with a current carrying conductor is connected in series circuit with the primary windings of an iron-core current transformer and an air-gap-containing iron-core current transformer. The iron-core current transformer secondary is adapted to develop a first voltage signal proportional to the instantaneous magnitude of the current flowing in the conductor, while the secondary of the air-gap-containing current transformer is adapted to provide a second voltage signal proportional to the rate of change of the current flowing in the conductor. The two voltage signals are separately level detected, and if they both exceed respectively pre-selected threshold levels, a circuit breaker trip function is initiated.

It is accordingly an object of the present invention to provide an improved instantaneous trip mode network for static trip circuit breakers.

Another object is to provide an instantaneous trip mode network of the above character which predicates circuit breaker tripping solely on the rate of change of the currents flowing in a power distribution circuit being protected.

A further object is to provide an instantaneous trip mode network of the above character which utilizes non-saturable current transformers for sensing the currents flowing in the power circuit conductors.

Yet another object is to provide an instantaneous trip mode network of the above character which utilizes air-core current transformers capable of developing secondary voltage signals directly proportional to the rates of change of the currents flowing in the power circuit conductors.

A still further object is to provide an instantaneous trip mode network of the above character which is less prone to initiating nuisance circuit breaker tripping.

A further object is to provide an instantaneous trip mode network of the above character which is inexpensive to implement and reliable in operation.

Other objects of the invention will in part be obvious and in part appear hereinafter.

SUMMARY OF THE INVENTION

In accordance with the present invention there is provided an instantaneous trip mode network for implementation with a static trip circuit breaker having the capability of affording full utilization of the circuit breaker's short-time current rating while avoiding nuisance circuit breaker tripping in response to offset currents (exponentially decaying transient currents) of high peak amplitudes. To this end, the instantaneous trip mode network includes non-saturable current transformers, preferably air-core current transformers, for individually sensing the phase currents flowing in the phase conductors of a power distribution circuit. The secondaries of these current transformers develop voltage signals proportional to the rates of change of the sensed phase currents. A diode rectifying network connected with the current transformer secondaries provides a rectified output signal voltage corresponding to the one secondary signal voltage of the highest magnitude. A filter network removes high frequency noise and spurious voltage spikes of short duration, e.g., less than 500 microseconds. A comparator measures the filtered, rectified signal voltage against a pre-selected threshold voltage corresponding to a desired instantaneous trip setting, and issues a circuit breaker trip initiating signal when the signal voltage level achieves the threshold voltage level.

In one disclosed embodiment of the invention, the instantaneous trip mode network is integrated into a circuit breaker static trip unit including conventional, saturable current transformers having iron cores encompassing the power distribution circuit phase conductors. These transformers produce secondary currents corresponding to the phase currents from which are extracted signals indicative of the peak amplitudes of the phase currents for processing by long-time and short-time trip mode networks, as well as operating power for the three trip mode networks and the circuit breaker trip function. The instantaneous trip mode network includes means for automatically, momentarily lowering the pre-selected comparator threshold voltage if the selected instantaneous trip setting is above the "close and latch" current rating of the circuit breaker, and thus ensure adequate protection should the circuit breaker be closed in on a high level fault.

In another embodiment of the invention, a standalone, self-powered instantaneous trip mode network is provided. That is, the non-saturable current transformers, in addition to providing the signal voltages proportional to the rates of change of the phase currents, provide operating power for the comparator and the circuit breaker trip function.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

DESCRIPTION OF THE DRAWINGS

Corresponding reference numerals refer to like parts throughout the several views of the drawings.

DETAILED DESCRIPTION

Figure 1:
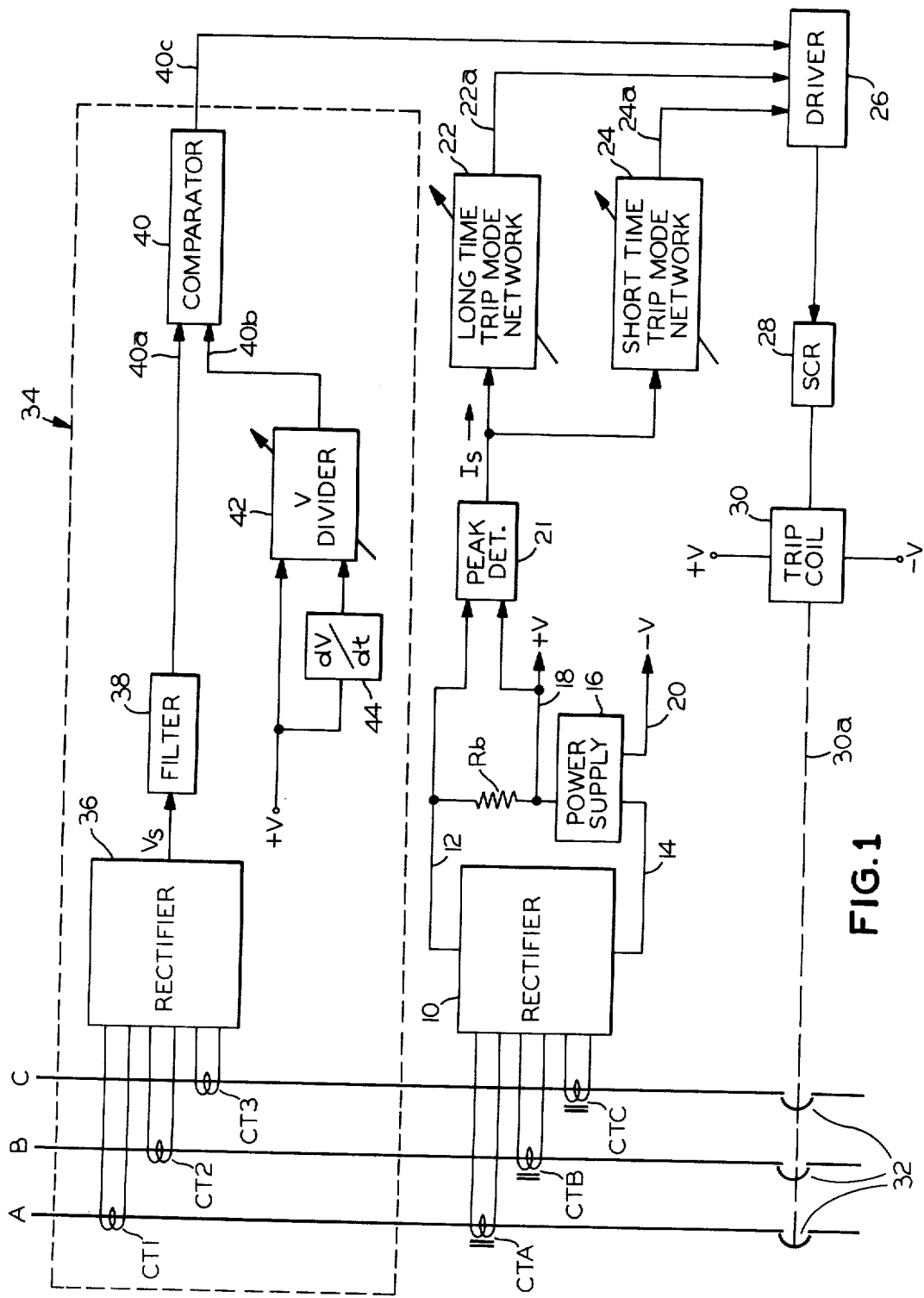
FIG. 1 is a schematic diagram, essentially in block form, of a circuit breaker static trip unit incorporating an instantaneous trip mode network constructed in accordance with an embodiment of the present invention.

Referring to FIG. 1, a static trip unit is generally disclosed for incorporation in a circuit breaker pursuant to providing overcurrent protection for a power distribution circuit consisting of three line or phase conductors A, B and C. The currents in the three phase are individually sensed by traditional, iron-core current transformers CTA, CTB and CTC. The multi-turn secondary windings of these current transformers are connected into a full-wave diode rectifying network, generally indicated at 10, whose construction may be that disclosed in applicant's commonly assigned U.S. Pat. No. 4,115,829. Positive going full-wave rectified current flows out of the rectifying network onto bus 12 and returns via negative bus 14. The current on bus 12 flows through a burden resistor Rb pursuant to developing a DC signal voltage thereacross of a magnitude proportional to the magnitude of the highest of the phase currents flowing in conductors A, B and C.

A power supply 16, connected between the lower end of burden resistor Rb and bus 14, functions to develop across a bus 18, connected with the lower end of the burden resistor, and bus 20 a regulated supply voltage V. Buses 12 and 18 are also connected as separate inputs to a peak detector 21 which thus responds to the signal voltage developed across burden resistor Rb. It is seen that this signal voltage is superimposed on the regulated positive supply voltage V appearing on bus 18. Peak detector 21 may be of the construction disclosed in my commonly assigned, co-pending application entitled "Fast Recovery Peak Detector", Ser. No. 062,460, filed July 31, 1979. As disclosed therein, the peak detector converts the signal voltage to a proportionate current signal Is which is supplied in common to a long-time trip mode network 22 and a short-time trip mode network 24. If the magnitude of the current signal indicates an overload condition on the distribution circuit, the long-time trip mode network, after a long-time delay inversely related to the overcurrent magnitude, issues a trip signal over its output lead 22a to a driver circuit 26. In response to this trip signal, the driver circuit applies a gate signal to a thyristor 28, such as silicon controlled rectifier, which goes into full conduction to draw activating current from power supply 16 through a trip coil 30. Consequent actuation of the trip coil is, as diagrammatically indicated at 30a, mechanically coupled to trip circuit breaker contacts 32 to open circuit positions, thereby interrupting current flow in all three phase conductors of the distribution circuit.

If the magnitude of current signal Is appearing at the output of peak detector 21 is of a magnitude indicative of a heavy overload condition on the distribution circuit, short-time trip mode network 24 generates, after an appropriate short-time delay, a trip signal on its output lead 24a for application to driver circuit 26, which then issues a gate signal to SCR 28, effecting activation of trip coil 30 and consequent tripping open of breaker contacts 32.

Still referring to FIG. 1, the static trip unit further includes, in accordance with the present invention, an instantaneous trip mode network, generally indicated at 34. In contrast to the saturable current transformers CTA, CTB, CTC utilized in providing magnitude intelligence regarding the phase currents, the instantaneous trip mode network utilizes non-saturable current transformers CT1, CT2, CT3 in providing rate of change intelligence regarding the phase currents flowing in conductors A, B, C. These current transformers, preferably of the air-core type, develop voltage signals in their multi-turn secondary windings which are proportional to the rate of change of the phase currents respectively flowing in their primary windings. These secondary voltage signals are applied to a full-wave diode rectifying network 36 which functions to provide a rectified output voltage signal Vs corresponding to the one secondary voltage signal having the greatest instantaneous magnitude. This voltage signal Vs is filtered in a filter network 38 to remove RF noise and spurious, short duration voltage spikes prior to its application to one input 40a of a comparator circuit 40. The other comparator input 40b is a pre-selected threshold voltage derived from the power supply regulated voltage via an adjustable voltage divider 42. When the voltage signal Vs achieves the pre-selected threshold voltage, signifying the existence on one of the phase conductors of a high level fault current wavefront having an ultimate peak amplitude in excess of the desired trip level, generally above that sensible by the amplitude sensing current transformers CT1, CT2, and CT3, comparator circuit 40 issues, without intentional delay, a trip signal on its output lead 40c running to driver circuit 26. Thyristor 28 is triggered into conduction to initiate, via trip coil 30, an instantaneous circuit breaker trip function.

To provide adequate protection for the circuit breaker should it be closed in on an existing high level fault condition with its instantaneous trip setting selected by voltage divider 42 in excess of the breaker "close and latch" current rating, means are provided to temporarily lower the comparator threshold voltage. This is necessary, since a breaker "close and latch" current rating is less than its full short-time current rating. That is, a circuit breaker can endure a higher level of fault current occurring while closed than it can when closed in on an existing fault. To this end, a differentiator 44, in response to the raising of the supply voltage into regulation by the power supply during the brief interval after breaker closure, conditions voltage divider 42 to apply a lower threshold voltage level to comparator input 40b. When the supply voltage V achieves its steady state, regulated level, differentiator 44 becomes inactive, and the pre-selected threshold voltage is re-established in voltage divider 42.

Figure 2:
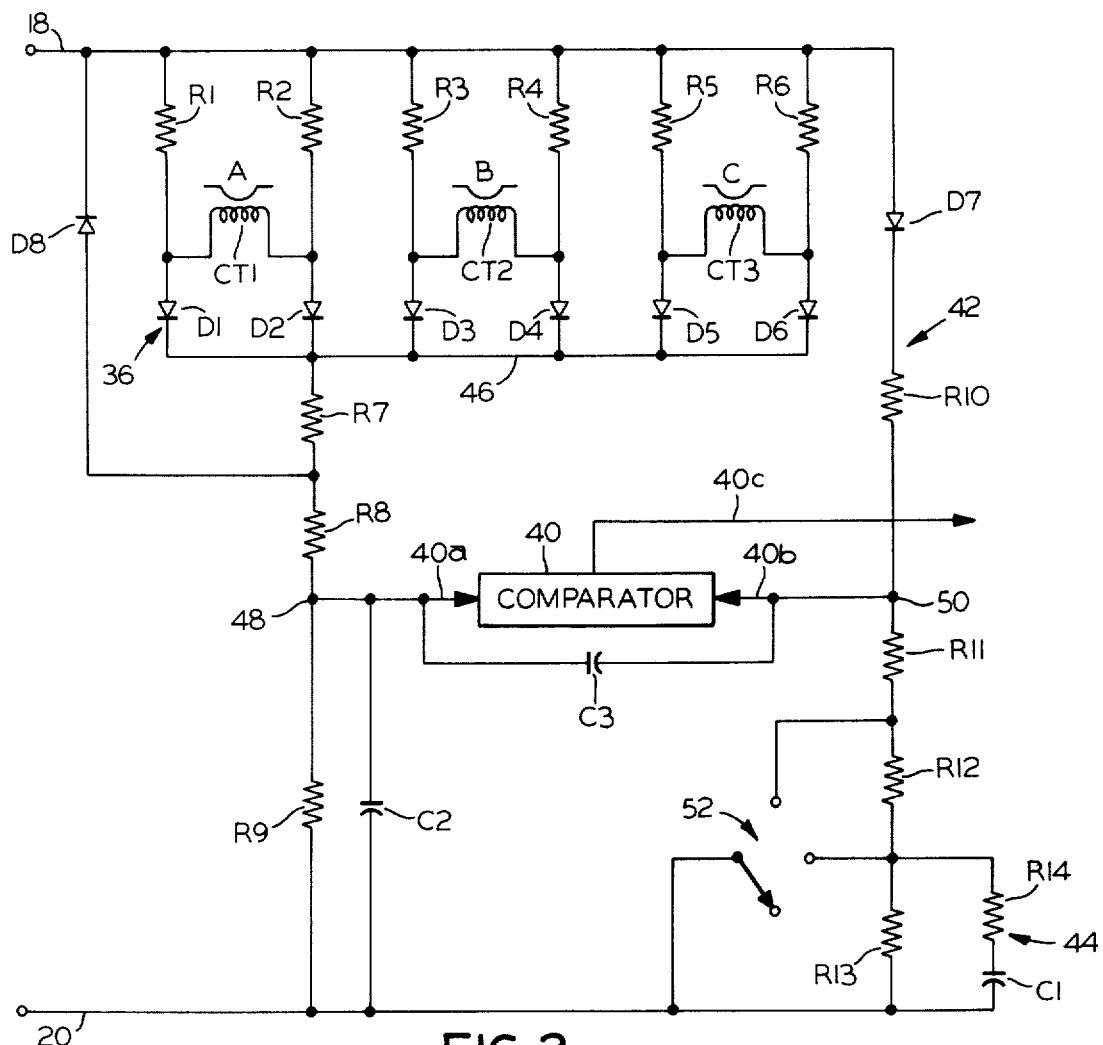
FIG. 2 is a circuit schematic diagram of the instantaneous trip mode network of FIG. 1.

For a detailed disclosure of instantaneous trip mode network 34, reference is now made to FIG. 2. Each side of each air-core current transformer secondary winding is connected to the positive supply bus 18 through separate resistors R1-R6, all of essentially equal resistance. This circuit configuration creates an effective center tapping of each secondary winding. Each side of each secondary winding is connected to a positive voltage signal bus 46 through separate diodes D1-D6 comprising full-wave rectifying network 36 in FIG. 1. The rectified voltage signal Vs appearing on bus 46 corresponds to the one of the secondary voltage signals having the highest instantaneous magnitude and thus is proportional to the greatest instantaneous current rate of change, i.e. di/dt, existing on any one of three phases conductors A, B, C.

Voltage signal bus 46 is connected to negative supply bus 20 by a fixed voltage divider consisting of resistors R7, R8 and R9. The junction 48 between resistors R8 and R9 is connected to input 40a of comparator 40. Connected between supply buses 18 and 20 is the adjustable voltage divider 42 of FIG. 1, which is seen in FIG. 2 to comprise a diode D7, and resistors R10, R11, R12 and R13. The pre-selected threshold voltage appears at junction 50 between resistors R10 and R11 which is connected to comparator input 40b. Adjustment of the threshold voltage level is provided by a selector switch 52 operative to switch out either resistor R13 or both resistors R12 and R13 from the adjustable voltage divider 42. Differentiator 44 in FIG. 1 consists of a resistor R14 serially connected with a capacitor C1 in shunt with resistor R13. It is seen that when switch 52 is positioned to its blank contact as shown, resistors R12 and R13 are included in the voltage divider to thus select the highest level of threshold voltage for application to comparator input 40b. This establishes the highest instantaneous trip setting which is assumed to exceed the fault current magnitude the breaker can stand when closed in on an existing fault, i.e., its "close and latch" current rating. For faults occurring after the breaker has been closed and latched, the highest instantaneous trip setting utilizing the full short-time current rating of the breaker can be tolerated.

To sense that the breaker has just been closed, differentiator 44 responds to the rise of the supply V as the power supply brings it up into regulation. Specifically, the differentiator effectively reduces the resistance of resistor R13 during the rise of the supply voltage, thus lowering the threshold level and, by the same token, the instantaneous trip setting for existing fault conditions. In the absence of an existing fault condition when the breaker is closed, as the supply voltage V approaches its regulated level, the differentiator progressively switches in the full resistance of resistor R13. Thus within a short interval after the breaker is closed, the pre-selected highest instantaneous trip setting is re-established. Since the other two positions of selector switch 52 are assumed to establish instantaneous trip settings at fault current levels less than the maximum tolerable when the breaker is closed in on an existing fault, i.e., less than its "close and latch" current rating, the differentiator 44 is not needed and is therefore switched out of the voltage divider 42.

Capacitor C2, connected in shunt with resistor R9, and capacitor C3, shunting the comparator inputs 40a and 40b comprise filter 38 in FIG. 1. Capacitor C2 provides radio frequency noise filtering, while capacitor C3 serves to filter out short duration, e.g., less than 500 microseconds, spurious voltage spikes appearing at junction 48.

From the foregoing description of the instantaneous trip mode network 34 detailed in FIG. 2, it is seen that the supply voltage appearing across buses 18, 20 develops a quiescent voltage at junction 48 which is less than the lowest threshold voltage selectable by switch 52. The highest of the secondary voltage signals developed by current transformers CT1, CT2, CT3 is rectified and appears superimposed on this quiescent voltage at junction 48. It will be noted that, by virtue of the circuit configuration, the rectified signal voltage is not affected by the diode voltage drops of rectifying network 36. If the rectified secondary signal voltage raises the voltage at junction 48 to the threshold voltage level at junction 50, comparator 40 issues its instantaneous trip initiating signal on output lead 40c running to driver circuit 26 in FIG. 1. To provide temperature compensation for the threshold voltage at junction 50, diode D7 is included in voltage divider 42 to match the temperature dependent voltage drops of rectifying network diodes D1-D6 which affect the quiescent voltage level at junction 48. Diode D8 is connected as a clamp between positive supply bus 18 and the junction of resistors R7 and R8 to limit the maximum voltage developed at junction 48.

Figure 3:
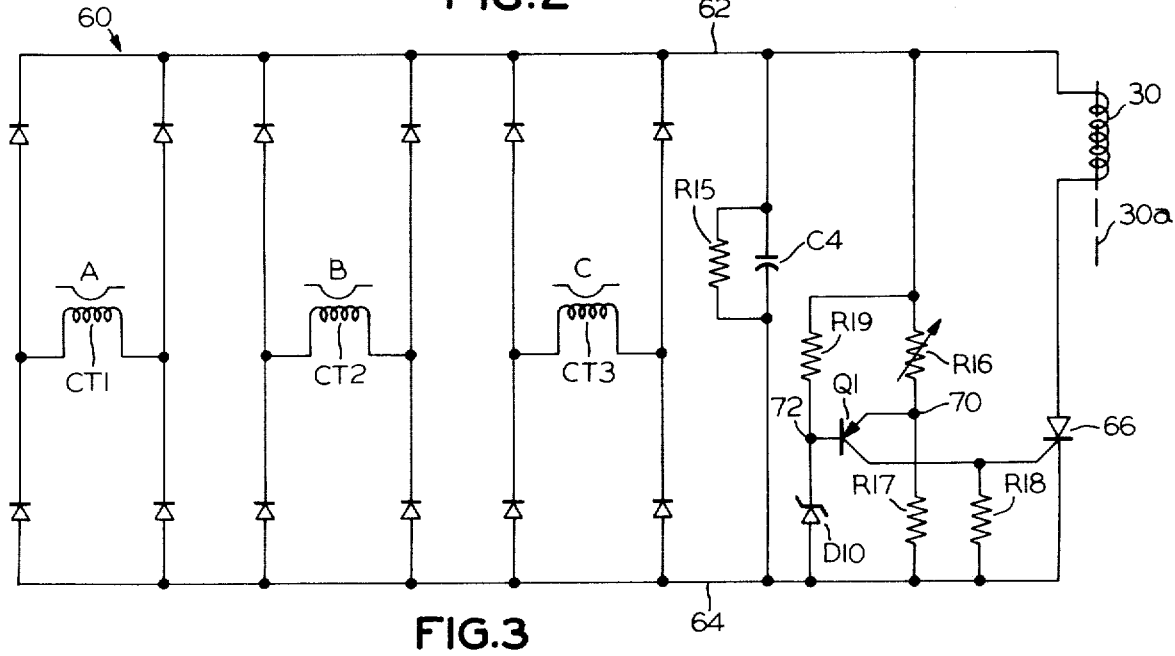
FIG. 3 is a circuit schematic diagram of a stand-alone, self-powered instantaneous trip mode network constructed in accordance with another embodiment of the invention.

In FIG. 3, there is disclosed an embodiment of my invention which provides a self-powered, stand-alone instantaneous trip mode network utilizing non-saturating current transformers CT1, CT2, CT3, again preferably of the air-core type, for developing current rate of change voltage signals, as well as sufficient operating power to activate a flux-shifting trip coil pursuant to initiating an instantaneous trip function. Specifically, the secondary winding of phase current rate of change sensing current transformers are connected into a full-wave diode rectifying network, generally indicated at 60. The highest magnitude secondary signal voltage appears full-wave rectified across rectifying network output buses 62 and 64. Filtering of radio frequency noise and short duration voltage spikes is provided by a capacitor C4 and a resistor R15 connected in parallel across buses 62, 64. Also, serially connected across buses 62 and 64 is a thyristor 66, such as a silicon controlled rectifier, and the operating or trip coil 30 of a conventional flux-shifting type trip actuator such as utilized in the static trip unit of FIG. 1. A voltage divider, consisting of a variable resistor R16 and a fixed resistor R17, is additionally connected across buses 62, 64. The junction 70 between these resistors is connected to the emitter of a transistor Q1, whose collector is connected with the gate of thyristor 66 to bus 64 through a resistor R18. The base of this transistor is connected to the junction 72 of a resistor R19 and a zener diode D10 connected in series between buses 62, 64.

From the foregoing description, it is seen that zener diode D10 effectively establishes a threshold voltage at junction 72 against which to measure the attenuated peak value of the rectified signal voltage developed across buses 62,64 as appearing at junction 70. When the voltage at junction 70 exceeds the zener voltage of diode D10 by one base-emitter voltage drop, transistor Q1 goes into conduction to develop a gate voltage across resistor R18 sufficient to trigger thyristor 66 into conduction. The rectified signal voltage across buses 62, 64, then drives activating current through trip coil 30 to initiate an instantaneous trip function via its mechanical coupling 30a with the breaker contacts. By adjustment of resistor R16, the attenuation of the signal voltage at junction 70 is varied to effectively change the instantaneous trip setting.

I have determined that providing the current transformers CT1, CT2, CT3 with toroidal cores having an outside diameter of 3.5 inches, an inside diameter of 2 inches and 388 secondary turns, a secondary voltage signal of 11.8 volts would be produced at 35,000 amperes of primary RMS current with a source impedance of 0.925 ohms. This peak voltage would be sufficient to trigger the thyristor into conduction and produce sufficient peak current to activate a conventional flux shifting type trip actuator.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. For protecting an AC electrical power distribution circuit against high level fault currents, an instantaneous trip mode network comprising, in combination:
   A. a separate air-core current transformer linked with each phase conductor of the distribution circuit and including a multi-turn secondary winding in which is developed a sinusoidal secondary voltage signal proportional to the rate of change of the phase current flowing in the linked phase conductor;
   B. a diode rectifying network connected with said secondary winding of each said air-core transformer for developing a rectified voltage signal corresponding to the one of said secondary voltage signals having the greatest magnitude;
   C. a signal input circuit connected to receive said rectified voltage signal, said circuit including
      (1) an input lead on which appears a voltage input signal proportional to said rectified voltage signal,
      (2) capacitance means connected with said input lead for filtering from said voltage input signal spurious, short duration, high amplitude voltage spikes which are not indicative of ultimate phase current peak amplitude, and
      (3) said input circuit affording effective charging and discharging current paths for said capacitance means such that said voltage input signal constitutes a rectified sinusoidal wave continuously reflecting the rate of change of that one of the phase currents having the greatest magnitude;
   D. detector means connected with said input lead to receive said voltage input signal and operating to issue a circuit breaker trip initiating signal when said voltage input signal achieves a pre-selected threshold voltage level, whereby to predicate circuit breaker tripping solely on the change of phase current with respect to time exceeding a pre-selected rate.

2. The instantaneous trip mode network defined in claim 1, wherein said capacitance means filters out voltage spikes of durations less than 500 microseconds.

3. The instantaneous trip mode network defined in claim 1, which further includes a circuit breaker trip initiating coil and a thyristor connected in series across the outputs of said rectifying network, said detector means trip initiating signal triggering said thyristor into conduction, whereupon said rectified voltage signal drives sufficient activating current through said trip coil to effect tripping of the circuit breaker.

4. The instantaneous trip mode network defined in claim 1, wherein said threshold voltage is pre-selected at a level such that said trip initiating signal is issued in response to a phase current having a magnitude approaching the contact popping level of the circuit breaker, and said instantaneous trip mode network being incorporated in a circuit breaker trip unit having a separate iron-core current transformer linked with each phase conductor and including a multi-turn secondary winding in which is developed a secondary current proportional to the phase current flowing in the linked phase conductor, means for deriving from said secondary current a signal corresponding to that phase current having the greatest magnitude and a supply voltage for powering the static trip unit, and means for processing said signal pursuant to selectively initiating time delayed tripping of the circuit breaker.

5. The instantaneous trip mode network defined in claim 4, which further includes means for automatically, momentarily adjusting said pre-selected threshold voltage to a reduced level such that said trip initiating signal is issued in response to a phase current having a magnitude approaching the close and latch current rating of the circuit breaker.

6. A static trip unit for incorporation in a circuit breaker operating to protect an electrical power distribution circuit against overcurrent conditions, said static trip unit comprising, in combination:
   A. a separate iron-core current transformer linked with each phase conductor of the distribution circuit and including a multi-turn secondary winding in which is developed a secondary current proportional to the phase current flowing in the linked phase conductor;
   B. a rectifier for rectifying said secondary current;
   C. a burden resistor and a power supply connected in circuit with said rectifier for respectively developing a signal voltage proportional to the magnitude of the phase current and a regulated supply voltage across first and second supply buses for powering the static trip unit and a circuit breaker trip function; and D. an instantaneous trip network including
   (1) a separate air-core current transformer linked with each phase conductor and including a multi-turn secondary winding in which it is developed a secondary voltage signal proportional to the rate of change of phase current flowing in the linked phase conductor,
   (2) a diode rectifying network connected with said secondary winding of each said air-core transformer for developing a rectified voltage signal corresponding to the one of said secondary voltage signals having the greatest magnitude,
   (3) an adjustable voltage divider connected across said first and second supply buses for developing a pre-selected threshold voltage level as a DC offset of the regulated supply voltage,
   (4) detector means responsive exclusively to said rectified voltage signal for issuing a circuit breaker trip initiating signal when said rectified voltage signal achieves said pre-selected threshold voltage level, whereby to predicate circuit breaker tripping solely on the change of phase current with respect to time exceeding a pre-selected rate, and
   (5) filter means interconnected between said rectifying network and said detector means for filtering from said rectified voltage signal radio frequency noise and spurious, short duration voltage spikes.

7. The instantaneous trip mode network defined in claim 6, which further includes a differentiator connected with said voltage divider and responsive to the rise of the supply voltage into regulation for momentarily lowering said threshold voltage at least when pre-selected to its maximum selectable level.

8. The instantaneous trip mode network defined in claim 6, which further includes a separate identically valued resistor connecting each side of each said air-core current transformer secondary winding to the first supply bus, a rectified voltage signal bus, said rectifying network including a separate, like-poled diode connecting each side of each said air-core current transformer secondary winding to said voltage signal bus, and an additional voltage divider connecting said voltage signal bus to the second supply bus and developing a DC offset of said signal voltage for application to said detector means.

9. The instantaneous trip mode network defined in claim 8, which further includes an additional diode included in said adjustable voltage divider as temperature compensation for said rectifying network diodes.

10. The instantaneous trip mode network defined in claim 8, which further includes a differentiator connected with said voltage divider and responsive to the rise of the supply voltage into regulation for momentarily lowering said threshold voltage at least when pre-selected to its maximum selectable level.

* * * * *